US012755641B2

(12) United States Patent
Bageshwar et al.

(10) Patent No.: US 12,755,641 B2
(45) Date of Patent: Oct. 6, 2026

(54) DETECT AND AVOID TRACKING ARCHITECTURE

(71) Applicant: Honeywell International Inc., Charlotte, NC (US)

(72) Inventors: Vibhor L. Bageshwar, Rosemount, MN (US); Eric A. Euteneuer, St. Anthony Village, MN (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 1142 days.

(21) Appl. No.: 17/846,899

(22) Filed: Jun. 22, 2022

(65) Prior Publication Data

US 2025/0363898 A1 Nov. 27, 2025

(51) Int. Cl.
*G08G 5/80* (2025.01)
*G08G 5/21* (2025.01)
(Continued)

(52) U.S. Cl.
CPC ................. *G08G 5/80* (2025.01); *G08G 5/21* (2025.01); *G08G 5/55* (2025.01); *G08G 5/57* (2025.01)

(58) Field of Classification Search
CPC .. G08G 5/80; G08G 5/21; G08G 5/55; G08G 5/57
See application file for complete search history.

(56) References Cited

U.S. PATENT DOCUMENTS 9,507,020 B2 * 11/2016 Bageshwar ............. G01S 7/282
9,851,437 B2 12/2017 Bageshwar et al.
(Continued)

FOREIGN PATENT DOCUMENTS

CN 112083420 A 12/2020
CN 113221944 A 8/2021
(Continued)

OTHER PUBLICATIONS

Bageshwar et al. "Multi-Intruder Aircraft, Multi-Sensor Tracking System", paragraph Nos. provided, retrieved by Examiner Nov. 5, 2025. (Year: 2015).*

European Patent Office, "Extended European Search Report", from EP Application No. 23177850.7 from Foreign Counterpart to U.S. Appl. No. 17/846,899, filed Nov. 29, 2023, pp. 1 through 11, Published: EP.

(Continued)

*Primary Examiner* — Jason Holloway
*Assistant Examiner* — Madison B Emmett
(74) *Attorney, Agent, or Firm* — Fogg & Powers LLC

(57) ABSTRACT

A vehicle detect and avoid system comprises a sensor arrangement including cooperative sensors, non-cooperative sensors, or combinations thereof. A detect and avoid module receives first measurement tracks from the cooperative sensors, and second measurement tracks from a first category of non-cooperative sensors. A correlator system communicates with the detect and avoid module, receives measurements from second or third categories of non-cooperative sensors, and outputs correlated measurement tracks. The detect and avoid module fuses the first measurement tracks from the cooperative sensors, the second measurement tracks from the first category of non-cooperative sensors, and the correlated measurement tracks, to estimate an optimal track for objects or targets in an environment around the vehicle. The optimal track for each of the objects or targets is used by the detect and avoid module to provide guidance to a guidance and/or control system so the vehicle remains well clear of the objects or targets.

20 Claims, 10 Drawing Sheets

(51) Int. Cl.
*G08G 5/55* (2025.01)
*G08G 5/57* (2025.01)

(56) References Cited

U.S. PATENT DOCUMENTS

| | | | | |
|---|---|---|---|---|
| 10,309,784 | B2 | 6/2019 | Bageshwar et al. | |
| 10,605,607 | B2 | 3/2020 | Bageshwar et al. | |
| 10,725,169 | B2 * | 7/2020 | Goossen | G08G 5/21 |
| 11,037,453 | B2 | 6/2021 | Dawson-Townsend | |
| 11,175,142 | B2 | 11/2021 | Bageshwar et al. | |
| 11,181,935 | B2 | 11/2021 | Choi et al. | |
| 2015/0160338 | A1 | 6/2015 | Bageshwar et al. | |
| 2018/0246200 | A1 | 8/2018 | Goossen et al. | |
| 2018/0335515 | A1 * | 11/2018 | Eberle | G01S 13/42 |
| 2019/0019423 | A1 * | 1/2019 | Choi | G05D 1/106 |
| 2020/0118451 | A1 * | 4/2020 | Dawson-Townsend | G08G 5/25 |
| 2020/0184834 | A1 * | 6/2020 | Lohmiller | G08G 5/26 |
| 2025/0347806 | A1 * | 11/2025 | Menon | G01S 13/933 |

FOREIGN PATENT DOCUMENTS

| | | | |
|---|---|---|---|
| CN | 114119663 | A | 3/2022 |
| EP | 3091525 | A1 | 11/2016 |
| WO | 2019183858 | A1 | 10/2019 |

OTHER PUBLICATIONS

Bageshwar et al, "Multi-Intruder Aircraft, Multi-Sensor Tracking System", 2015 IEEE/AUAA 34th Digital Avionics Systems Conference (DASC), Sep. 13-17, 2015, Prague, Czech Republic, pp. 5A5-1 through 5A5-13.

Kalur et al., "Multi-Sensor Scene Segmentation for Unmanned Air and Ground Vehicles using Dynamic Mode Decomposition", Conference Paper, AIAA Scitech 2020 Forum, Orlando, FL, Jan. 6-10, 2020, pp. 1 through 17.

Israel Patent Office, Notice of Deficiencies for Patent Application 303301, dated Oct. 16, 2025, from IL Application No. 303301, from Foreign Counterpart to U.S. Appl. No. 17/846,899, pp. 1 through 4, Published: IL.

* cited by examiner

DETECT AND AVOID TRACKING ARCHITECTURE

BACKGROUND

Detect and Avoid (DAA) systems allow unmanned aircraft systems (UAS) such as unmanned aircraft (UA) to operate safely in the National Airspace (NAS), avoiding collisions with other air traffic, buildings, and other obstacles. The DAA systems provide a similar functionality to UAS vehicles that the see-and-avoid functionality provides for piloted aircraft, enabling UAS vehicles to remain well clear of other air traffic in the NAS.

The DAA systems for UAS vehicles include four main systems: detect, tracking, evaluation, and guidance. The detect system consists of onboard and offboard surveillance sensors that measure the kinematics of air traffic. The tracking system fuses measurements from on-board and off-board surveillance sensors to estimate one optimal track of air traffic relative to the ownship UAS. The evaluation and guidance systems use these tracks to ensure the ownship UAS remains well clear of other air traffic.

Surveillance sensors can be classified as cooperative or non-cooperative. Cooperative sensors provides an International Civil Aviation Organization (ICAO) identification number, or ID, with measurement tracks of intruder aircraft. A measurement track is a sequence of measurements originating from the same intruder aircraft accompanied with a unique ID. Non-cooperative sensors can be categorized into three groups depending on the types of measurements provided: category 1—measurement tracks with consistent sensor specific IDs; category 2—measurement tracks with inconsistent IDs; and category 3—measurement returns with no IDs. The typical difference between category 1 and category 2/3 non-cooperative sensors is a correlation algorithm that provides consistent track IDs, or a correlation algorithm that performs data association and provides consistent track IDs.

Various DAA tracking systems have been developed to be used with either non-cooperative sensors, or with cooperative sensors. However, there are no tracking architectures that use both cooperative and non-cooperative sensors of varying grades, with different types of available measurements.

SUMMARY

A Detect and Avoid system comprises a surveillance sensor arrangement onboard a vehicle, the surveillance sensor arrangement comprising one or more cooperative sensors, one or more non-cooperative sensors, or a combination of one or more cooperative sensors and one or more non-cooperative sensors. The one or more cooperative sensors are operative to provide a respective first measurement track for each of one or more objects or targets in an environment around the vehicle, wherein each respective first measurement track includes a respective first track ID. The one or more non-cooperative sensors comprise a first sensor category operative to provide a respective second measurement track for each of the one or more objects or targets around the vehicle, wherein each respective second measurement track includes a respective second track ID; a second sensor category including: a first sensor sub-category operative to provide consistent sequences of track measurements originating from a same object or target, but with inconsistent and changing track IDs, and a second sensor sub-category operative to provide multiple measurement tracks with consistent IDs for an object or target, but with the multiple measurement tracks at a measurement epoch for the object or target; and a third sensor category operative to provide measurement returns without a measurement track correlation or ID.

A detect and avoid module is hosted on an onboard processor, with the detect and avoid module configured to receive the respective first measurement track from the one or more cooperative sensors, and the respective second measurement track from the first sensor category of the one or more non-cooperative sensors. A correlator system is hosted on an onboard processor, with the correlator system in operative communication with the detect and avoid module, the correlator system configured to receive measurements from the second or third sensor categories of the one or more non-cooperative sensors, and to output one or more correlated measurement tracks. A navigation system onboard the vehicle is operative to calculate a navigation solution for the vehicle. The navigation system is in operative communication with the detect and avoid module, and with the correlator system. The detect and avoid module is operative to fuse the respective first measurement track from the one or more cooperative sensors, the respective second measurement track from the first sensor category of the one or more non-cooperative sensors, and the one or more correlated measurement tracks from the correlator system, to thereby estimate an optimal track for each of the one or more objects or targets. The optimal track for each of the one or more objects or targets is used by the detect and avoid module to provide guidance to an onboard vehicle guidance and/or control system to remain well clear of the one or more objects or targets.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
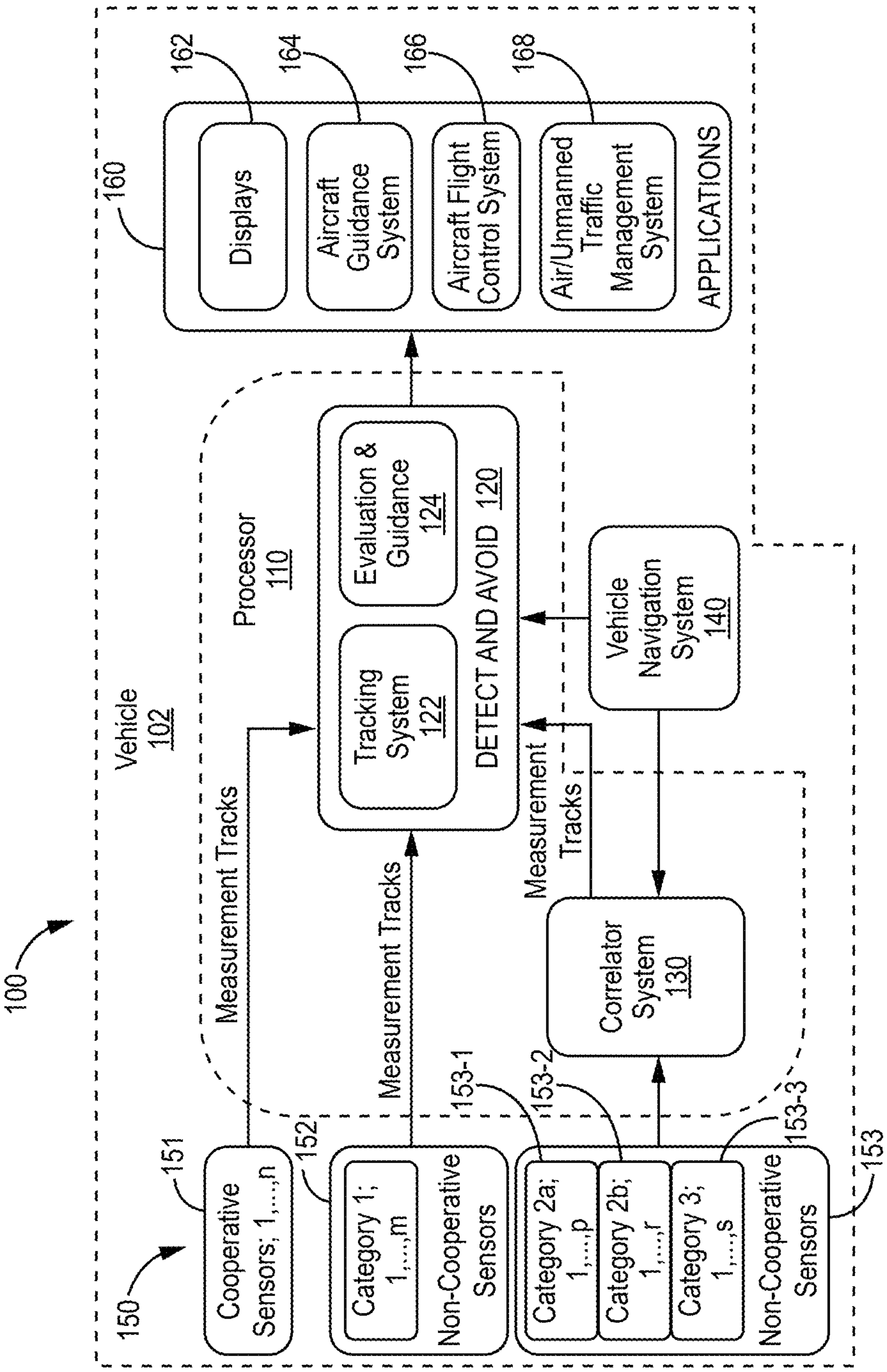
FIG. 1 is a block diagram of a DAA tracking architecture, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A DAA system architecture is described herein, which can be employed to provide safe operation of a vehicle, such as an unmanned aircraft systems (UAS) vehicle in the NAS.

The DAA system architecture is operative to estimate measurement tracks for objects or targets in an environment around the vehicle, by using any combination of cooperative and non-cooperative surveillance sensors. The DAA system architecture fuses cooperative sensor measurements tracks, and measurement tracks or measurement returns from various non-cooperative sensors.

A UAS vehicle needs to be equipped with both cooperative and non-cooperative surveillance sensors because intruder aircraft might not be equipped with transponders for cooperative sensors. The present DAA system architecture can accommodate any type of surveillance sensor measurement, and provides a unique capability for UAS vehicles because the system architecture is useable for any size of UAS vehicle in any operating environment.

The DAA system architecture includes a tracking system that is operative to fuse measurement tracks from different surveillance sensors to estimate the trajectory statistics, or tracks, of objects or targets such as intruder aircraft relative to an ownship vehicle. The tracking system fuses the measurement tracks to estimate one optimal track for each object regardless of the number or combination of surveillance sensors providing measurement tracks of that object.

The DAA system architecture also includes a correlator system to generate measurement tracks from measurement returns of non-cooperative surveillance sensors. These measurement tracks identify sequences of measurements that originate from an object such an intruder aircraft and assigns such as a sequence a sensor specific ID. The correlator system can be hosted on a processor located on the sensor hardware, on a processor that also hosts the tracking system, or on another processor.

The present DAA tracking architecture fuses surveillance sensor measurement returns or measurement tracks to estimate one statistically optimal track of an object or target, such as cooperative and non-cooperative intruder aircraft, relative to an ownship aircraft. Applications downstream of the DAA tracking architecture require one track of the object or target regardless of the number surveillance sensors observing the object or target. For example, a ground display of the ownship aircraft can display too many tracks for each intruder aircraft leading to a lot of clutter. The present approach prevents guidance algorithms from computing well clear maneuvers for non-existent intruder aircraft, and minimizes clutter for pilot displays.

The present DAA tracking architecture can be used across all groups (1-5) of UAS vehicles, and can operate with surveillance sensors of different grades, size, weight, power, cost, and performance characteristics.

With respect to the description herein, the terms "object" or "target" can be used interchangeably, and generally refer to items that are in motion, while the term "feature" generally refers to items that are stationary.

Further details related to the present systems and methods are described as follows and with reference to the drawings.

FIG. 1 is a block diagram of a DAA tracking architecture 100, according to one embodiment. The DAA tracking architecture 100 generally comprises at least one processor 110 onboard a vehicle 102, such as a UAS vehicle or other aircraft, a detect and avoid module 120 hosted by processor 110, and a correlator system 130 that operatively communicates with detect and avoid module 120. A vehicle navigation system 140 operatively communicates with detect and avoid module 120, and with correlator system 130. The detect and avoid module 120 includes a tracking system 122, and an evaluation and guidance system 124.

A plurality of sensors 150 is in operative communication with processor 110. The plurality of sensors 150 can include a first set 151 of one or more cooperative sensors, a second set 152 of one or more non-cooperative sensors (category 1), and a third set 153 of one or more non-cooperative sensors (categories 2 and 3).

The first set 151 of one or more cooperative sensors (1, . . . , n) are operative to provide respective one or more first measurement tracks for one or more objects or targets in an environment around vehicle 102. Each respective first measurement track includes a respective first track identifier (ID). The second set 152 of one or more non-cooperative sensors (category 1; 1, . . . , m) is operative to provide respective one or more second measurement tracks for one or more objects or targets around vehicle 102. Each respective second measurement track includes a respective second track ID.

In the third set 153 of one or more non-cooperative sensors, the category 2 sensors include a first sub-category 153-1 of non-cooperative sensors (category 2a; 1, . . . , p), and a second sub-category 153-2 of non-cooperative sensors (category 2b; 1, . . . , r). The first sub-category 153-1 of non-cooperative sensors is operative to provide consistent sequences of track measurements originating from the same object or target, but with inconsistent and changing track IDs. The second sub-category 153-2 of non-cooperative sensors is operative to provide multiple measurement tracks with consistent IDs for the object or target, but with the multiple measurement tracks at a measurement epoch for the object or target. Also in the third set 153, the category 3 sensors include one or more non-cooperative sensors 153-3 (1, . . . , s), which are operative to provide measurement returns without a measurement track correlation or ID.

The detect and avoid module 120 is in operative communication with the first set 151 of cooperative sensors and the second set 152 of non-cooperative sensors (category 1). A tracking system 122 of detect and avoid module 120 is configured to receive the respective first measurement tracks from the first set 151 of cooperative sensors, and the respective second measurement tracks from the second set 152 of non-cooperative sensors.

The correlator system 130 is in operative communication with the third set 153 of non-cooperative sensors. The correlator system 130 is configured to directly receive sensor measurements from the category 2 sensors including the first sub-category 153-1 of non-cooperative sensors (category 2a), and the second sub-category 153-2 of non-cooperative sensors (category 2b). The correlator system 130 is also configured to directly receive sensor measurements from the category 3 sensors including non-cooperative sensors 153-3.

In one implementation, correlator system 130 is operative to identify sequences of measurements that originate from the same object regardless of non-cooperative sensor and measurement track ID. The correlator system 130 overrides any ID provided by a sensor and assigns an ID to a measurement track itself for any sensors in the first sub-category 153-1 of non-cooperative sensors. The correlator system 130 fuses measurement returns from multiple measurement tracks of a sensor to generate a fused measurement track and assign an ID to the fused measurement track, overriding any track ID assigned by the sensor, for any sensors in the second sub-category 153-2 of non-cooperative sensors. The correlator system 130 also identifies sequences of measurement returns that originate from the same object and assigns the sequences an ID, for any non-cooperative sensors 153-3.

The correlator system 130 processes the various sensor measurements received from the third set 153 of non-cooperative sensors, as well as navigation data from vehicle navigation system 140. The correlator system 130 then outputs correlated measurement tracks, based on the sensor measurements and navigation data, to detect and avoid module 120.

The tracking system 122 of detect and avoid module 120 is operative to fuse the respective first measurement tracks from the first set 151 of cooperative sensors, the respective second measurement tracks from the second set 152 of non-cooperative sensors, and the correlated measurement tracks from correlator system 130. The tracking system 122 employs the fused measurement tracks to estimate an optimal track for each of the objects or targets. The estimated optimal track includes statistically optimal trajectory statistics for each object or target, such as intruder aircraft, with consistent IDs. The estimated optimal track is used by an evaluation and guidance system 124 to provide guidance data to various vehicle applications 160, such that vehicle 102 can be operated to avoid the objects or targets. Examples of vehicle applications 160 can include applications for one or more displays 162, an aircraft guidance system 164, an aircraft flight control system 166, an air/unmanned traffic management system 168, or the like.

Additional details related to various aspects of the present DAA tracking architecture are described hereafter.

Surveillance Sensors

The DAA tracking architecture supports a range of sensor modalities and fusion strategies to maximize the probability a track corresponds to an actual object or target such as an intruder aircraft, and minimizes the number of false tracks. The various surveillance sensors employed in the present approach can be located onboard a vehicle, offboard such as ground-based sensors, or both onboard and offboard sensors can be employed.

As mentioned above, surveillance sensors can include cooperative sensors, and various categories of non-cooperative sensors. The cooperative sensors provide measurement tracks of objects, such as intruder aircraft, with an ICAO ID. A measurement track is a sequence of measurements originating from the same object or target, such as an intruder aircraft, accompanied with either an ICAO ID or sensor specific ID. Examples of cooperative sensors include Automatic Dependent Surveillance-Broadcast (ADS-B) sensors, and Traffic Collision Avoidance System (TCAS) Mode-S sensors.

As described above, the non-cooperative sensors can be categorized into three groups depending on the types of measurements provided: category 1—measurement tracks with consistent sensor specific IDs; category 2—measurement tracks with inconsistent IDs; and category 3—measurement returns with no IDs. For example, the category 1 non-cooperative sensors provide trusted measurement tracks of intruder aircraft with sensor specific IDs. Examples of category 1 non-cooperative sensors includes TCAS Mode-C sensors, as well as certain radars and vision sensors such as cameras.

As described previously, the category 2 non-cooperative sensors include two sub-categories. In the first sub-category (2a), the sensor correctly provides consistent sequences of track measurements originating from the same intruder aircraft, but provides inconsistent, changing IDs of the tracks. In the second sub-category (2b), the sensor provides multiple measurement tracks with consistent IDs for intruder aircraft; however, the sensor provides multiple measurement tracks at a measurement epoch for the same intruder aircraft. The category 3 non-cooperative sensors provide measurement returns of intruder aircraft with no measurement correlation or IDs. Examples of category 2 and 3 non-cooperative sensors include some radars and vision sensors such as cameras.

Figure 2:
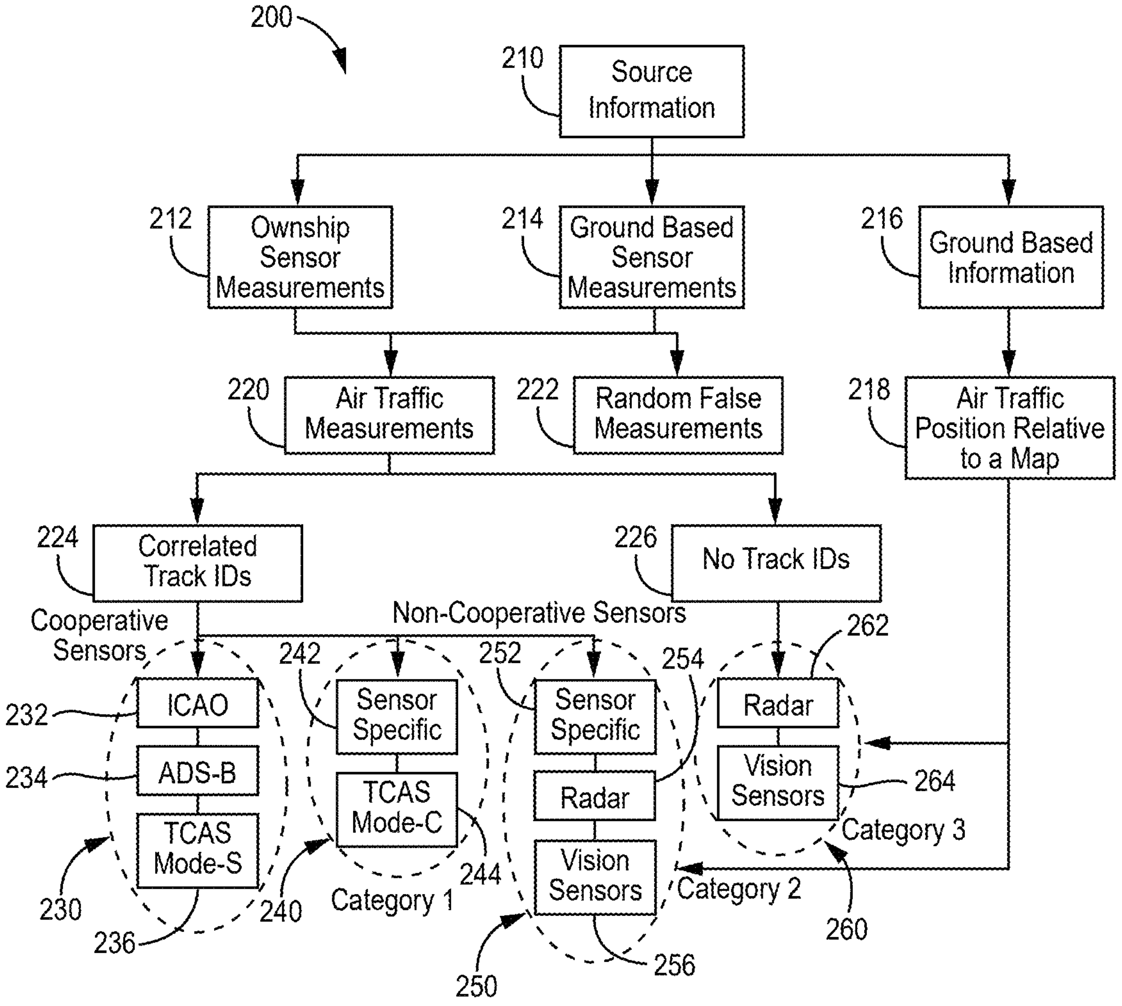
FIG. 2 is a block diagram of a surveillance sensor arrangement, according to one implementation, which can be employed in the DAA tracking architecture.

FIG. 2 is a block diagram of an exemplary surveillance sensor arrangement 200, according to one implementation, which can be employed in the present DAA tracking architecture. The sensors and information sources shown in FIG. 2 can be mounted on an ownship aircraft (e.g., UAS air based sensors), located on the ground (ground based sensors), or both air based and ground based sensors can be employed.

As depicted in FIG. 2, a source of information 210 provides ownship sensor measurements 212, ground based sensor measurements 214, and ground based information 216 such as air traffic position relative to a map (block 218). The ownship sensor measurements 212 and ground based sensor measurements 214 can both provide air traffic measurements 220, and random false measurements 222. The air traffic measurements 220 can include correlated track IDs (block 224), or no track IDs (block 226).

A set of cooperative sensors 230 are equipped to receive measurement tracks with ICAO IDs 232, and include ADS-B sensors 234, and TCAS Mode-S sensors 236. A set of category 1 non-cooperative sensors 240 are equipped to receive measurement tracks with consistent sensor specific IDs 242, and include TCAS Mode-C sensors 244. A set of category 2 non-cooperative sensors 250 are equipped to receive measurement tracks with inconsistent sensor specific IDs 252, and include some radar sensors 254, and some vision sensors 256. A set of category 3 non-cooperative sensors 260 are equipped to receive measurements with no track IDs (from block 226), and include other radar sensors 262, and other vision sensors 264. In addition, ground based information such as air traffic position relative to a map (from block 218) can fall under category 2 non-cooperative sensors 250 and the category 3 non-cooperative sensors 260.

Correlator System

The correlator system is used to generate sensor measurement tracks for non-cooperative sensors that do not internally correlate measurement returns and provide sensor specific IDs. The correlator system is based on a unique application of a multiple hypothesis testing approach. The objectives of the correlator system include: associate and statistically fuse multiple returns originating from the same object or target at the same time epoch so that there is one measurement return per target at each time epoch; identify a sequence of measurements originating from the same object or target over multiple time epochs; coast through sensor scan pattern strategies; coast through missed detections; assign an ID to the sequence of sensor measurement returns; identify an unknown number of targets; reject false measurements; and use range rate measurements to assist with data association when available.

It should be noted that the objectives of the correlator system do not include smoothing of the sensor measurement tracks, however, some smoothing of the measurement returns is inevitable for the following reasons. First, filtering is required to merge multiple returns of the same target at a particular time epoch. Second, filtering is required to coast through the sensor's scanning patterns. Third, filtering is required to coast through missed detections. Fourth, filtering is required to predict measurement locations of current tracks to associate with current measurement returns.

Figure 3:
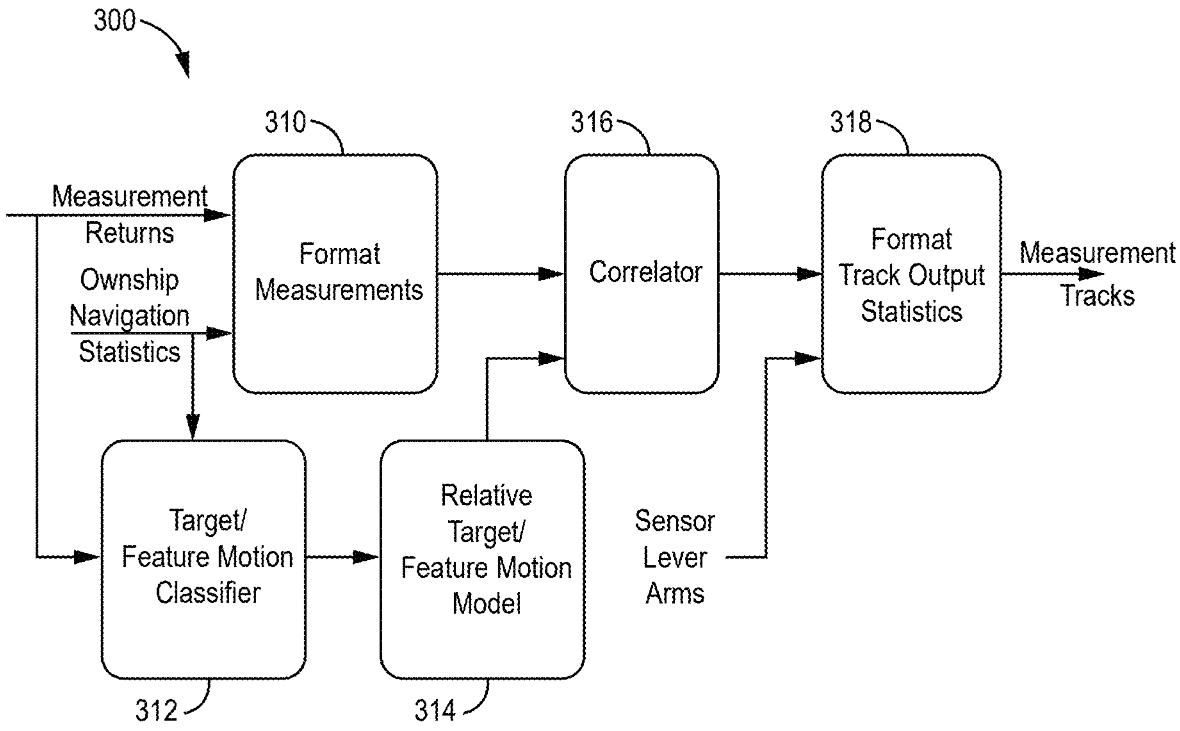
FIG. 3 is a block diagram of a correlator system, according to one embodiment, which is used in the DAA tracking architecture.

FIG. 3 is a block diagram of a correlator system 300, according to one embodiment, which can be employed in the present DAA tracking architecture. The correlator system 300 generally includes a format measurements unit 310 and a target/feature motion classifier 312, which are both configured to receive sensor measurement returns and ownship vehicle navigation statistics. A relative target/feature motion model 314 is responsive to an output from target/feature motion classifier 312. A correlator unit 316 is responsive to outputs from format measurements unit 310 and relative target/feature motion model 314. A format track output statistics unit 318 is responsive to an output from correlator unit 316 and is configured to receive sensor lever arm data. The format track output statistics unit 318 is operative to output measurement tracks for use by the tracking system. The various components of correlator system 300 are described in further detail as follows.

The format measurements unit 310 is operative to use the ownship vehicle navigation statistics to resolve the received measurement returns into a correlation reference frame specific for the given sensor. Note that the ownship vehicle navigation solution is needed to resolve the sensor measurement returns in the correlation reference frame so that the sensor measurement return statistics are a function of the grade and errors of the ownship vehicle navigation system.

The target/feature motion classifier 312 is operative to classify items measured by vision based sensors as moving or stationary for low-altitude operations. The target/feature motion classifier 312 is configured to use the ownship vehicle navigation statistics to resolve the measurement returns into a correlation reference frame specific for the vision based sensors—the same frame used by the format measurements unit 310. The target/feature motion classifier 312 then uses dynamic mode decomposition to identify foreground (moving) and background (stationary) targets/features from sequences of vision sensor measurements, or scenes. These scenes are decomposed into eigenmodes, or eigenvectors, where the eigenmodes correspond to projections of items or features in the scene over time. If the eigenvalues of these eigenvectors exceed a user-selected threshold, then the items are moving (targets). If the eigenvalues of these eigenvectors are less than this threshold, then the items are stationary (features).

The relative target/feature motion model 314 uses relative motion models called constant velocity models or, more precisely, nearly-constant velocity models where the three-dimensional (3D) relative velocity between the target/feature and the ownship vehicle is modeled using a stochastic process. The relative target/feature motion model 314 selects parameters of the vehicle model based on the velocity and altitude of the ownship vehicle, classification of vision sensor measurements into moving objects or targets, or stationary features, and the relative velocity between the targets/features and the ownship vehicle. The ownship vehicle navigation solution provides the velocity and altitude of the ownship vehicle. The relative target/feature motion model 314 selects model parameters based on 1) the velocity and altitude of the ownship vehicle; 2) the velocity of the moving targets or stationary features in the scenes; and 3) the relative velocity of the moving targets or stationary features in the scene. In effect, the model parameters are adapted to reflect the relative motion between the ownship vehicle and targets/features in the measurements of the vision based sensors. Different targets or features in the measurements of the vision based sensors can use different model parameters to reflect the actual relative motion to the ownship vehicle.

The correlator unit 316 can be divided into three major sub-functions: data association, track management, and correlation filters. The sub-functions are interdependent as they operate together to formulate measurement tracks for downstream systems and users. An exemplary algorithm for the correlator unit is described hereafter.

The format track output statistics unit 318 is operative to output the following track statistics in multiple reference frames: track ID; measurement time; object or target relative kinematics statistics resolved in the vehicle's body spherical frame; intruder aircraft range rate and its measurement statistics; air traffic velocities and their measurement statistics resolved in a local horizontal-local vertical reference frame; and validity flags for the various measurements.

The sensor lever arms, including the sensor's angular orientation relative to the vehicle body frame and the location of the sensor's measurement frame origin relative to the vehicle body frame, are used to resolve the track statistics in either a vehicle reference frame or a sensor reference frame from the correlation frame. In this manner, measurement tracks for sensors mounted at different locations and orientations on the ownship vehicle can be output in the same reference frame for downstream systems and users.

Various features of the correlator system are described in further detail as follows.

Target/Feature Motion Classifier

With respect to high-altitudes, the DAA system enables an ownship vehicle to remain well clear of air traffic. For example, either the ownship aircraft or the air traffic are, typically, flying at higher airspeeds (>>50 knots). Air traffic at high-altitudes can include hovering aircraft (e.g., helicopters), dirigibles (e.g., balloons, airships), or the like. Thus, the relative speeds for direct approach encounter scenarios between ownship vehicles and air traffic are high.

With respect to low-altitudes, the DAA system enables an ownship vehicle to remain well clear of air traffic and ground infrastructure. For example, ownship aircraft and air traffic are, typically, flying at lower airspeeds (<<50 knots), while ground infrastructure is stationary. Thus, the relative speeds between ownship vehicles and air traffic/ground infrastructure are low The objectives of the target/feature motion classifier are to distinguish between stationary and moving objects or targets at low-altitudes, and to select relative motion models (parameters) appropriate for an encounter scenario.

The target/feature motion classifier uses a multi-sensor scene segmentation technique to mathematically categorize vision sets of sensor measurements (or scenes) into stationary and foreground (moving) features, and to avoid statistical hand-waves for object classification. The multi-sensor scene segmentation technique employs dynamics-based segmentation (Dynamic Mode Decomposition) to classify objects as either stationary or foreground features in a scene from vision sensor data (e.g., from radar, camera, or LiDAR). Further details of this approach are described in A. Kalur et al., "*Multi-Sensor Scene Segmentation for Unmanned Air and Ground Vehicles using Dynamic Mode Decomposition*, AIAA 2020-1943; AIAA Scitech 2020 Forum, Orlando FL, 6-10 Jan. 2020, the disclosure of which is incorporated by reference herein.

In the multi-sensor scene segmentation technique, sequential measurements related by linear low-rank dynamics are employed, and vehicle kinematic state statistics are used to resolve sensor measurements into the same reference frame. Efficient eigen-decomposition for dynamic mode segmentation is performed. Incremental updates via Krylov methods and proper orthogonal decompression (POD) projections, determine eigenvalues of large, sparse matrices, expressed as:

$$K_r(A, b) = \text{span}\{b, Ab, A^2b, \ldots, A^{r-1}b\}$$

The Eigenvalues are then compared to a user-selected threshold. If the eigenvalues exceed the threshold, then the object or target is moving and likely air traffic. If the eigenvalues are less than the threshold, then the object or target is stationary. Low-altitude objects or targets can include ground infrastructure, ground features, rotary wing aircraft (e.g., helicopters or UAS), or the like. High-altitude objects or targets can include, operating with air traffic only, a dirigible (balloon or airship), a hovering helicopter, or the like. A dynamic system perspective can be used to connect vision based sensor modes, which are mapped into the same two-dimensional subspace.

Figure 4:
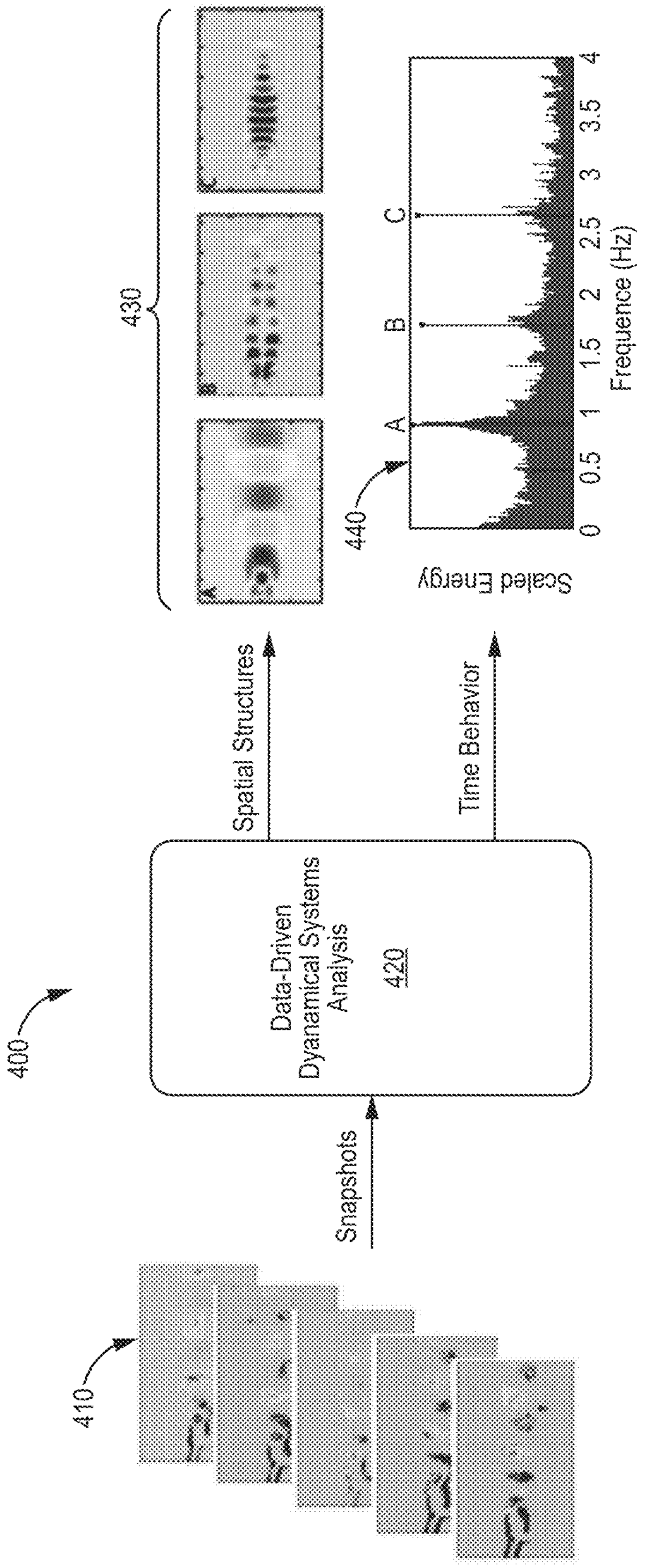
FIG. 4 is a diagrammatic representation of an example operation of a multi-sensor scene segmentation technique used in the correlator system.

FIG. 4 is a diagrammatic representation of an example operation 400 of the multi-sensor scene segmentation technique. As shown, a series of snapshots 410 of a scene are captured by a vision sensor, and sent to a data driven dynamical systems analysis unit 420 for processing. A set of spatial structure segments 430 (A, B, C) are generated, based on snapshots 410, and are output from systems analysis unit 420. A corresponding time behavior graph 440 for spatial structure segments 430 (A, B, C) is also output from systems analysis unit 420.

Figure 5A:
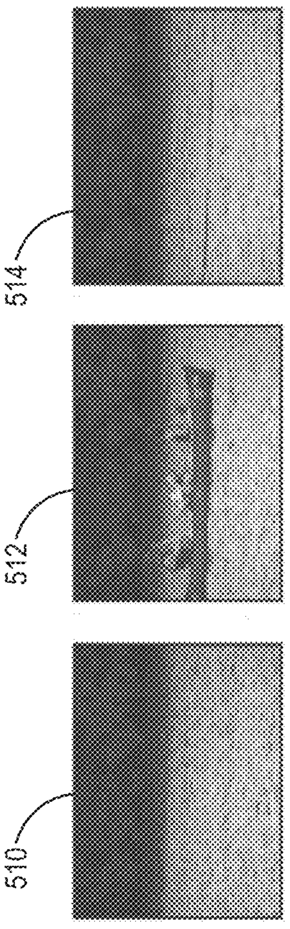
FIG. 5A shows sample frames of an example video sequence of a scene for which the multi-sensor scene segmentation technique is employed.
Figure 5B:
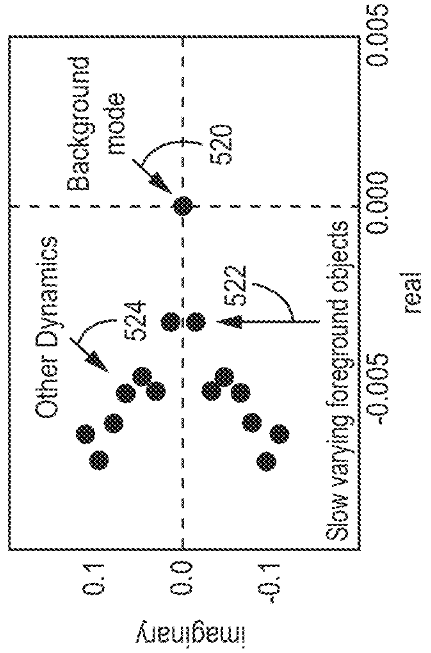
FIG. 5B is a graph of the dominant continuous-time eigenvalues for the sample frames of FIG. 5A.
Figure 5C:
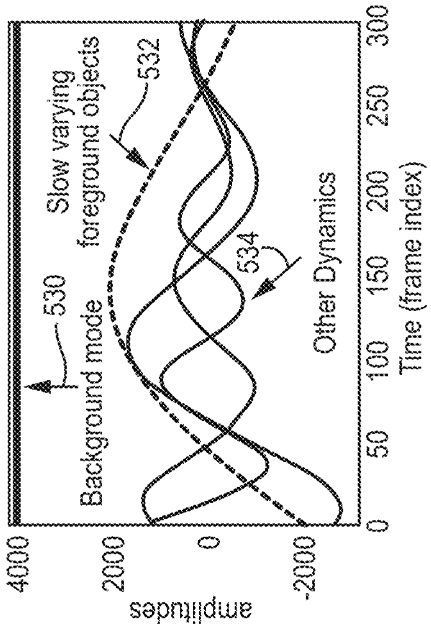
FIG. 5C is a graph of the eigenvalue amplitudes over time for the sample frames of FIG. 5A.

FIG. 5A shows sample frames of an example video sequence of a scene taken at a given time (t), with a frame 510 at t=0 sec, a frame 512 at t=150 sec, and a frame 514 at t=150 sec. FIG. 5B is a graph of the dominant continuous-time eigenvalues for the sample frames of FIG. 5A. A background mode is indicated at 520, slow varying foreground objects are indicated at 522, and other dynamics are indicted at 524. FIG. 5C is a graph of the eigenvalue amplitude over time (frame index) for the sample frames of FIG. 5A. The background mode is indicated at 530, the slow varying foreground objects are indicated at 532, and the other dynamics are indicted at 534.

Relative Motion Model Selector

Figure 6:
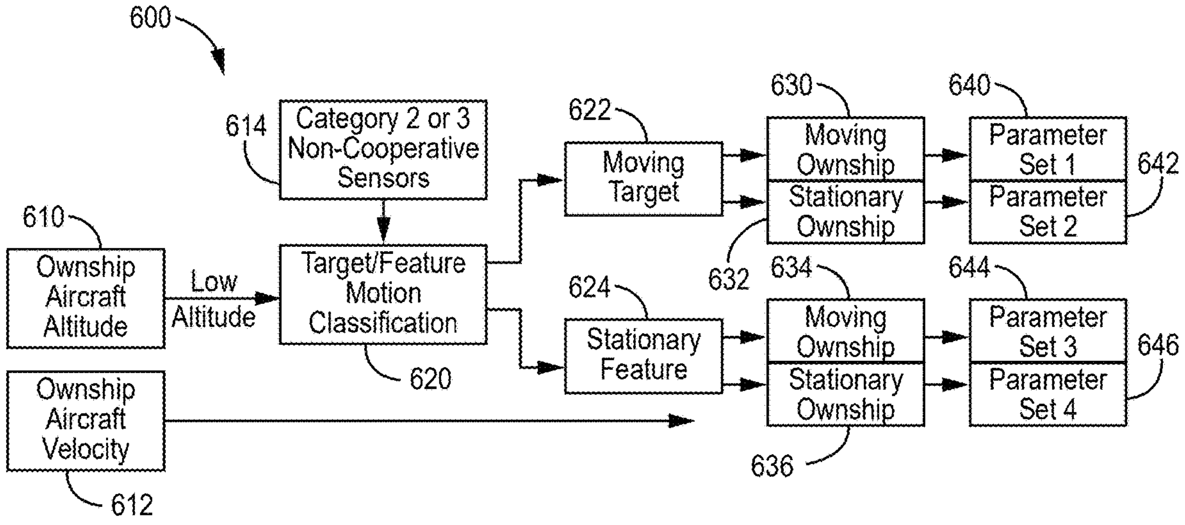
FIG. 6 is a block diagram of a relative motion model selector method used in the correlator system, according to one implementation.

The correlator system relative motion model includes constant velocity or nearly constant velocity, and Markov process models. FIG. 6 is a block diagram of a relative motion model selector method 600, according to one implementation. Initially, ownship navigation statistics are received from the vehicle navigation system, such as ownship aircraft altitude (block 610) and ownship aircraft velocity (block 612). In addition, sensor measurement returns are received from category 2 or 3 non-cooperative sensors (block 614). When the ownship aircraft altitude is a low operating altitude (e.g., typically less than about 500 m), the low altitude is provided for target/feature motion classification (block 620), along with the sensor measurement returns.

The target/feature motion classification (from block 620) is used to determine a moving target/object or a stationary feature, and outputs moving target data (block 622) or stationary feature data (block 624). The ownship aircraft velocity (from block 612) is used to identify whether the ownship is moving or stationary, and the ownship aircraft velocity is used to activate either moving ownship data (block 630)/(block 634) or the stationary ownship data (block 632)/(block 636), accordingly.

Coupled with the moving target data (from block 622), the moving ownship data (from block 630) is used to generate a first parameter set (block 640), and the stationary ownship data (from block 632) is used to generate a second parameter set (block 642). Coupled with the stationary feature data (from block 624), the moving ownship data (from block 634) is used to generate a third parameter set (block 644), and the stationary ownship data (from block 636) is used to generate a fourth parameter set (block 646).

One of the four parameter sets gets selected based on the ownship motion and the moving target/stationary feature classification. Accordingly, if there is a moving target and a moving ownship, then the first parameter set is selected; if there is a moving target and a stationary ownship, then the second parameter set is selected; if there is a stationary feature and a moving ownship, then the third parameter set is selected; and if there is a stationary feature and a stationary ownship, then the fourth parameter set is selected. The ownship aircraft velocity is used to determine whether the ownship is moving or stationary, such as if the ownship aircraft velocity is less than or equal to a user selected threshold.

The ownship aircraft velocity (from block 612) and the target/feature motion classification (from block 620) are used to model a relative 3D velocity as a stochastic process. The parameters sets can include maneuver time constants (length of time of the maneuver), maneuver standard deviations (loosely, the instantaneous variance of acceleration), and sensor measurement frequency. Thus, method 600 results in adaptable relative motion models tuned for actual encounter scenarios.

Correlator System Algorithm

The correlator system algorithm maintains two types of tracks: tentative tracks and confirmed (current) tracks. The correlator system algorithm requires M measurement returns from a target, such as an intruder aircraft, during the previous N measurement epochs for a tentative track to become confirmed, where M≤N. This approach enables the correlator system algorithm to reject random false measurements and spurious sensor measurements from creating a confirmed track for downstream systems or users.

The correlator system algorithm includes various sub-functions, including data association, track management, and correlation filters. The data association sub-function performs both measurement-to-measurement association and measurement-to-track association. Measurement-to-measurement association determines whether two or more measurement returns originate from the same target at a measurement epoch. Measurement-to-track association determines whether a surveillance sensor measurement can be associated with a tentative track or a confirmed track.

The track management sub-function operates together with the data association sub-function to perform the following tasks: initiate a new tentative track for a measurement return that was not used by the correlation filter sub-function to update a tentative track or confirmed (current) track; maintain tentative and confirmed target tracks; transition tentative tracks to confirmed tracks if the measurement sequence of the tentative tracks pass the MIN test; assign track IDs to confirmed target tracks; delete tentative tracks that don't satisfy the MIN test described above—this test rejects both false or spurious measurements by deleting tentative tracks formed from these measurements before they create confirmed tracks; and delete confirmed tracks for targets that leave a sensor's field of regard (FOR) using a track test.

The correlation filter sub-function fuses tentative and confirmed track statistics with the statistics of measurements returns to estimate the track statistics of the target relative to the ownship vehicle. Further, the correlation filter sub-function and the data association sub-function operate together to fuse together multiple measurement returns from the same target at a particular measurement epoch. This measurement-to-measurement association prevents the correlator system from outputting multiple tracks for the same target.

Figure 7:
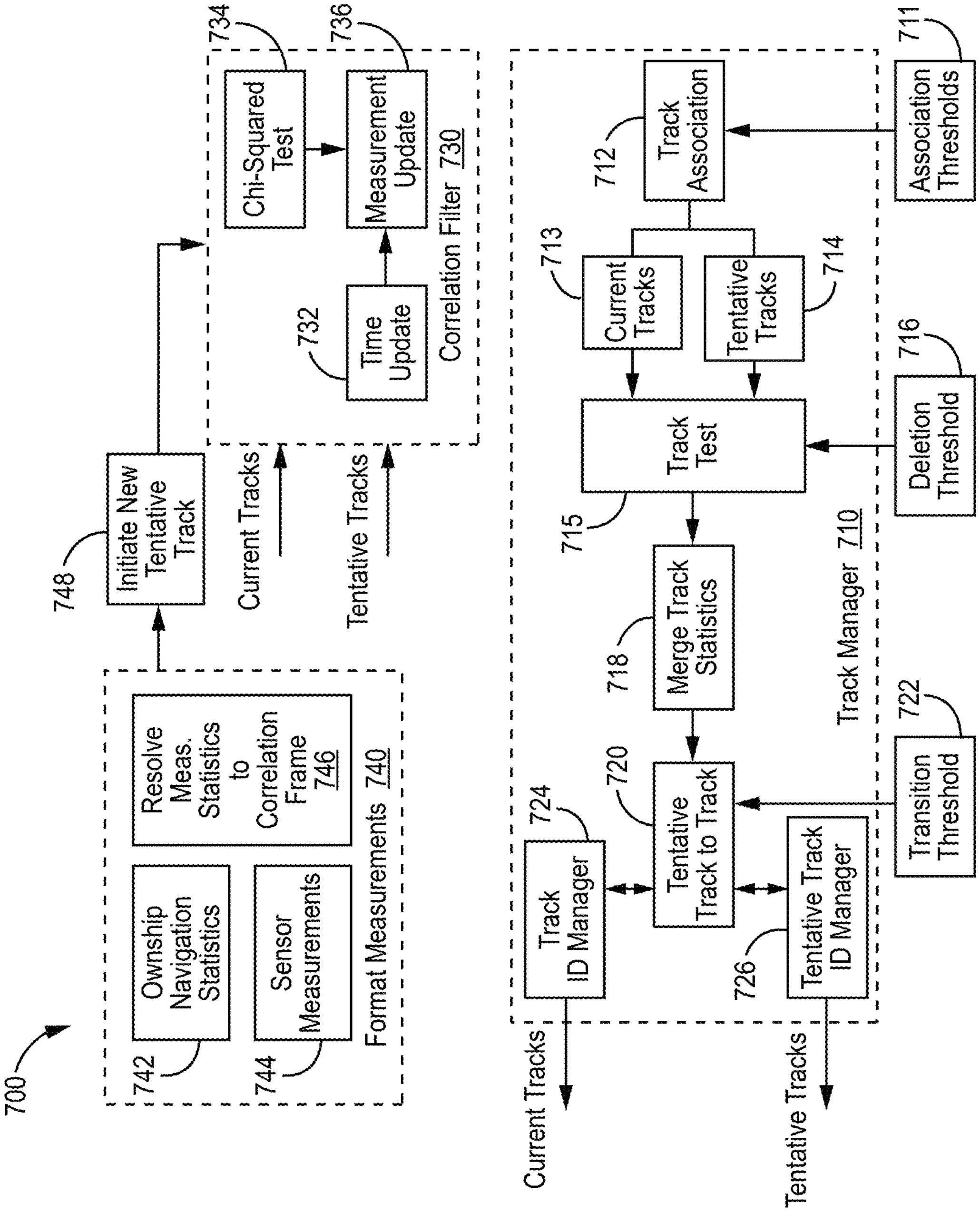
FIG. 7 is a block diagram of a correlator algorithm employed in the correlator system, according to an exemplary implementation.

FIG. 7 is a block diagram of an example correlator algorithm 700, according to one implementation. The correlator algorithm 700 includes various functional units, including a track manager unit 710 and a correlation filter unit 730, which is in operative communication with a format measurement unit 740.

The track manager unit 710 uses association thresholds 711 to provide a track association 712, which is used to produce current tracks 713 and tentative tracks 714. A track test 715 uses a deletion threshold 716 to decide whether to keep or delete current tracks 713 and tentative tracks 714. The tracks that are kept are sent to a merge track statistics block 718, which outputs the merged track statistics to a tentative track-to-track block 720. A transition threshold 722 is used by tentative track-to-track block 720 to determine whether to provide track data to track ID manager 724, or to tentative track ID manager 726. The track ID manager 724 outputs current tracks, and tentative track ID manager 726 outputs tentative tracks.

The format measurement unit 740 uses ownship navigation statistics 742 and sensor measurements 744, to resolve measurement statistics into a correlation frame at block 746 for a given sensor. The format measurement unit 740 initiates a new tentative track at 748 that is sent to correlation filter unit 730, to update the tentative tracks or current tracks output from track manager unit 710. The correlation filter unit 730 provides a time update step at 732 and a chi-squared test at 734, which are used with the output of block 746 to perform a measurement update at 736.

Figure 8:
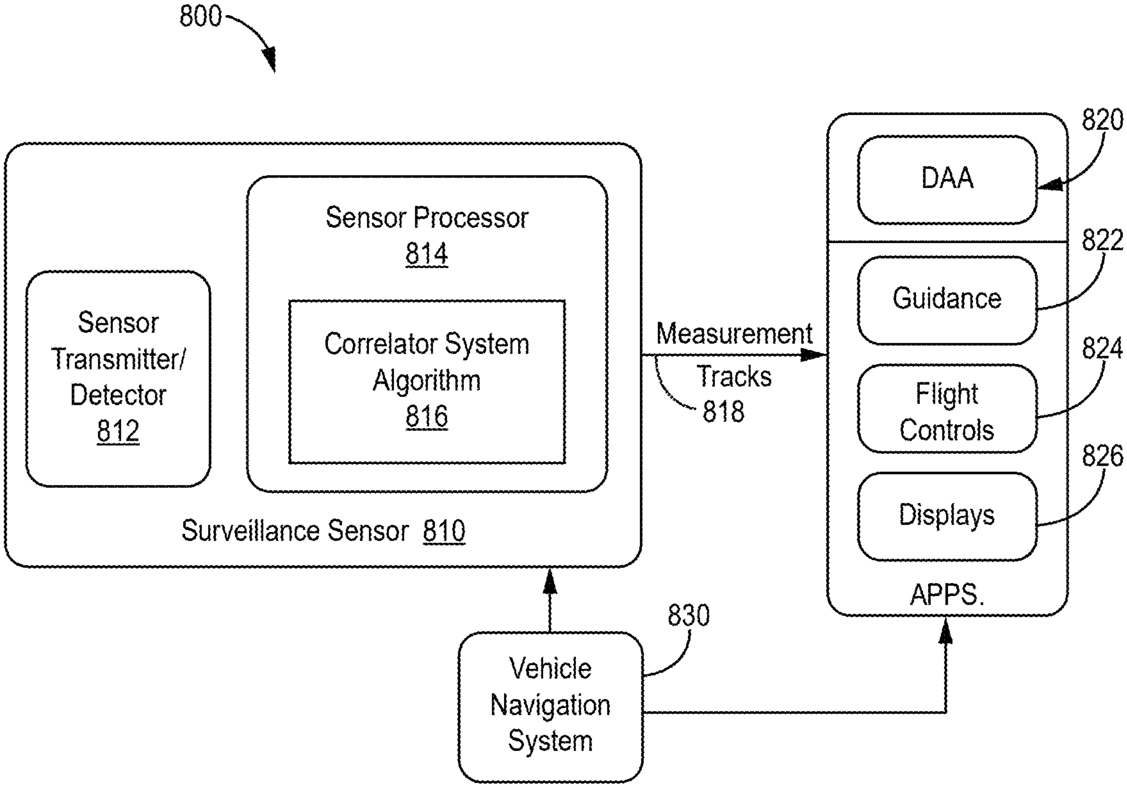
FIG. 8 is a block diagram of a DAA tracking system, according to an alternative embodiment.

In an alternative embodiment, the correlator system algorithm can reside on a sensor processor and not the detect and avoid (DAA) processor, so that the correlator functions do not affect DAA functionality or computational resources of the DAA processor. An example implementation of such an embodiment is shown in FIG. 8. There, a DAA tracking system 800 includes at least one surveillance sensor 810 having a sensor transmitter/detector 812, a sensor processor 814, and a correlator system algorithm 816. The surveillance sensor 810 operatively communicates with a DAA module 820. A vehicle navigation system 830 operatively communicates with detect and avoid module 820, and with surveillance sensor 810.

The correlator system algorithm 816 processes the sensor measurements from sensor transmitter/detector 812, as well as navigation data from vehicle navigation system 830. The correlator system algorithm 816 outputs correlated measurement tracks 818, based on the sensor measurements and navigation data, to DAA module 820 for further processing to provide tracking and guidance data to various vehicle applications. Examples of such vehicle applications can include applications for aircraft guidance 822, flight controls 824, and displays 826.

Tracking System

The tracking system is a multi-intruder, multi-sensor fusion system that estimates the track statistics of an object or target such as air traffic relative to an ownship vehicle. The tracking system is based on a unique application of a multiple hypothesis testing approach to track objects or targets in real-time. The tracking system fuses the measurements and statistical information from both cooperative and non-cooperative surveillance sensors into one framework to track air traffic in 3D.

Figure 9A:
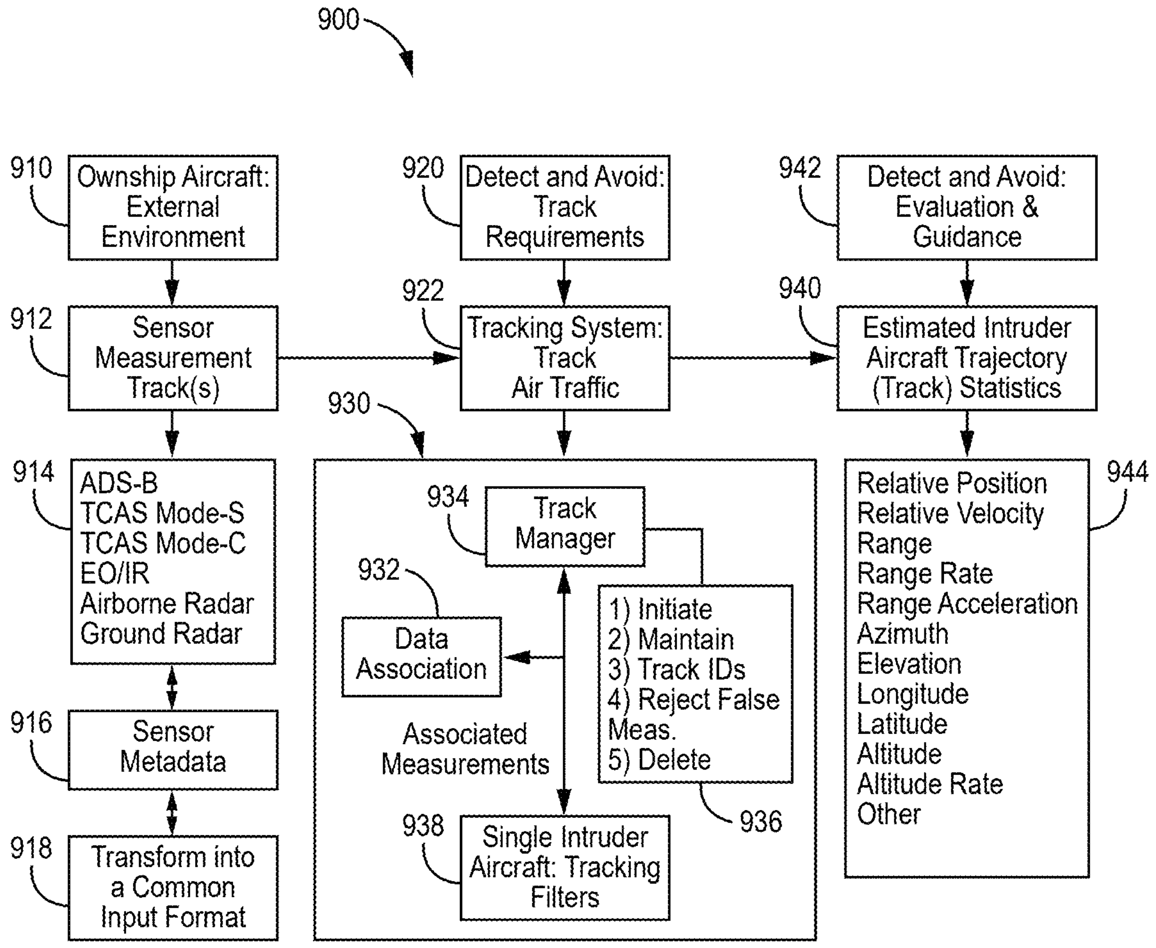
FIG. 9A is a block diagram of a tracking system, according to one embodiment, which is used in the DAA tracking architecture.
Figure 9B:
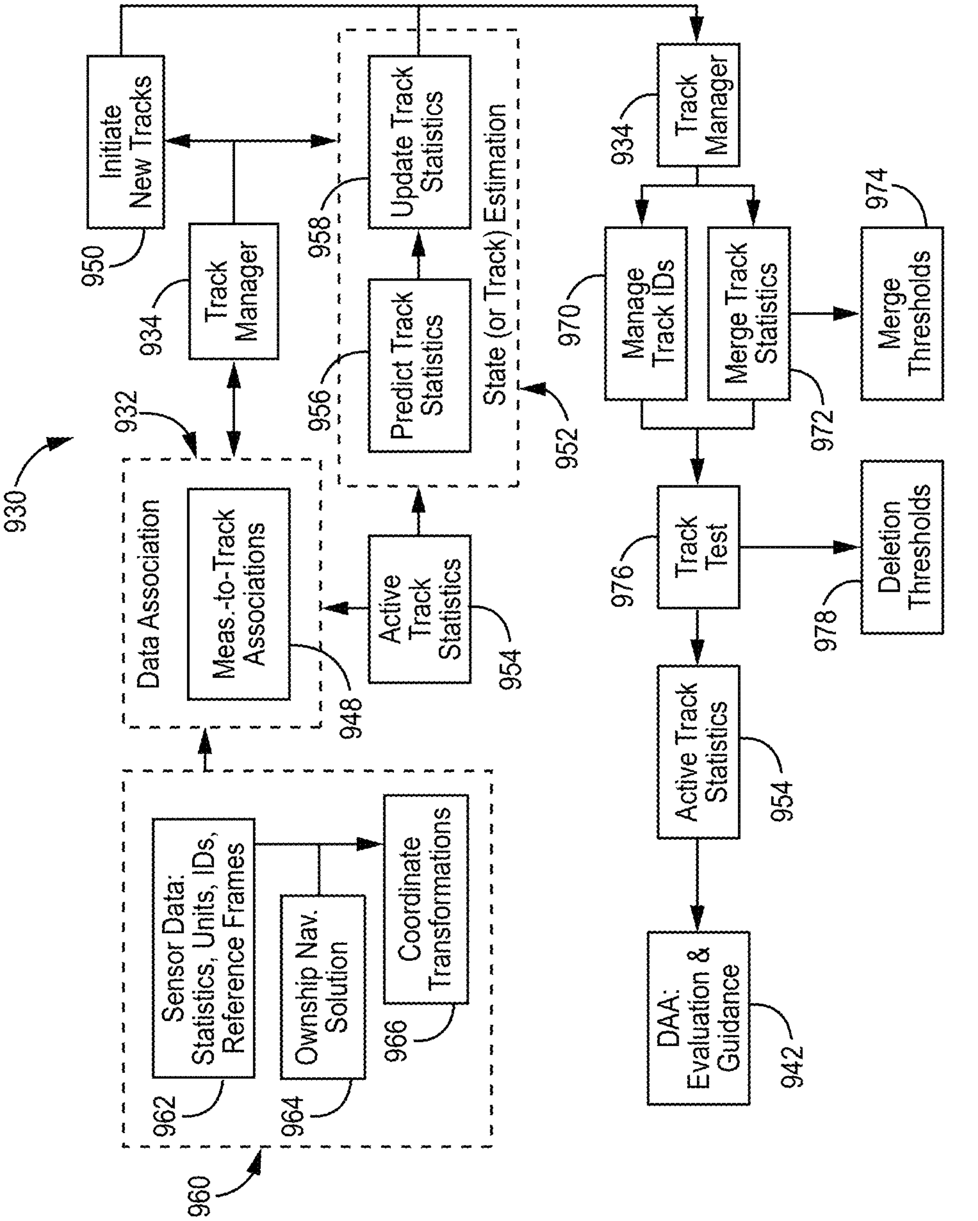
FIG. 9B is a block diagram of an exemplary tracking algorithm employed in the tracking system of FIG. 9B.

FIGS. 9A and 9B are block diagrams of an exemplary tracking system 900 and associated tracking algorithm 930, which are employed in the present DAA tracking architecture. As shown in FIG. 9A, with respect to an external environment of an ownship aircraft (block 910), a set of surveillance sensors provide sensor measurements (block 912) for used by tracking system 900. The surveillance sensors can be air-based or ground based sensors. Examples of such sensors include ADS-B sensors; TCAS for active surveillance of Mode-S equipped air traffic; TCAS Mode-C equipped air traffic; vision-based sensors such as electro-optical/infrared (EO/IR) imaging sensors; airborne radar; and ground-based radar (block 914). In addition, sensor metadata can be obtained (block 916), and sensor measurements can be transformed into a common input format (block 918) using the sensor metadata (block 916). The sensor metadata can include units, reference frame, frequency, time delay statistics, probability of detection, probability of false alarm, and the like. The tracking system 900 allows cooperative and non-cooperative vehicles to be tracked in the same framework.

As shown in FIG. 9A, a set of detect and avoid track requirements (block 920) are provided to enable the tracking system 900 to track air traffic (block 922) using the sensor measurement tracks (from block 912).

The tracking system 900 employs a tracking algorithm 930 that can be divided into the following sub-functions: a data association sub-function (block 932); a track management sub-function (block 934) using a track manager, and a state (or track) estimation sub-function (block 952, FIG. 9B). The track management sub-function operates together with the data association sub-function to perform the following tasks: 1) initiate intruder aircraft tracks; 2) maintain intruder aircraft tracks; 3) manage the track IDs output by the surveillance sensors; 4) reject false measurements and minimize generation of false tracks; and 5) delete tracks for air traffic that leave a sensor's FOR using a track test (block 936). In addition, tracking algorithm 930 provides tracking filters for single intruder aircraft (block 938). Further details of the operation of tracking algorithm 930 are described hereafter with respect to FIG. 9B.

The sub-functions of tracking algorithm 930 operate together to compute estimated air traffic trajectory (track) statistics (block 940), which are sent downstream to detect and avoid (DAA) evaluation and guidance functions (block 942). The computed track statistics can include mean and variance of the relative position, relative velocity, range, range rate, range acceleration, azimuth angle, elevation angle, longitude, latitude, altitude, altitude rate, or other statistics such as geodetic position, turn rate, and ground speed (block 944).

As illustrated further in FIG. 9B, the data association sub-function (block 932) of tracking algorithm 930 performs measurement-to-track associations (block 948) or, more specifically, determines whether a surveillance sensor measurement originates from actively tracked air traffic. If the sensor measurement originates from an active track, then the data association sub-function assigns the sensor measurement to the corresponding track. If the sensor measurement does not originate from actively tracked air traffic, then the data association sub-function (block 932) sends the measurement to the track management sub-function (block 934) to, possibly, initiate a new track (block 950).

Multiple sensors can simultaneously provide measurements originating from the same object or target with a combination of ICAO IDs and sensor specific IDs. The track management sub-function (block 934) maintains the track IDs from all sensors contributing to a particular track. Additionally, the track management sub-function adds or deletes a track ID associated with an estimated track as the object or target enters or leaves a sensor's FOR. The track management sub-function also maintains the track IDs associated with the estimated track if the object or target leaves the FOR of one sensor but remains within the FOR of other sensors.

The state (or track) estimation sub-function (block 952) fuses active track statistics (block 954) with the statistics of the measurements associated with the track (from the track manager) to predict the track statistics (block 956) and update the track statistics (block 958). This provides an estimate of the track statistics of the object or target relative to the ownship aircraft.

The sub-functions of tracking algorithm 930 operate together to estimate one statistically optimal track for each object or target from the combination of cooperative and non-cooperative sensors providing sensor measurement tracks originating from each object or target (block 960). The sensor data can include measurement statistics, units, IDs, and reference frames (block 962), which are combined with an ownship navigation solution (block 964), to compute coordinate transformations for the measurement tracks (block 966) and resolve the measurement tracks to a consistent reference frame, or tracking frame.

As shown in FIG. 9B, the track manager of track management sub-function (block 934) is operative to manage track IDs (block 970) and merge track statistics (block 972) using a set of merge thresholds (block 974). A track test (block 976) uses a set of deletion thresholds (block 978) to decide whether to keep or delete the merged tracks and associated track IDs (from blocks 970 and 972). The tracks that are kept are output as estimated active track statistics (block 954). These estimated active track statistics are sent to downstream systems such as the DAA evaluation and guidance functions (block 942), for computation of any well clear maneuvers, or ownship guidance and flight control systems; transmitted to other aircraft or users; or transmitted to displays or Ground Control Stations (GCS) for situation awareness. The tracking system can provide additional track statistics depending on the requirements of the DAA evaluation and guidance functions or the GCS.

The fusion of multiple surveillance sensor measurements enables tracking system 900 to coast through sensor missed detections; to take advantage of the most accurate measurements along a sensor axis; and to provide 3D track statistics in the event that a surveillance sensor provides only two dimensional measurement statistics. The sub-functions of tracking algorithm 930 also provide the ICAO IDs and/or sensor specific IDs according to user specified guidelines in addition to the track statistics.

The processing units and/or other computational devices used in systems and methods described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system, comprising: a surveillance sensor arrangement onboard a vehicle, the surveillance sensor arrangement comprising one or more cooperative sensors, one or more non-cooperative sensors, or a combination of one or more cooperative sensors and one or more non-cooperative sensors, wherein: the one or more cooperative sensors are operative to provide a respective first measurement track for each of one or more objects or targets in an environment around the vehicle, wherein each respective first measurement track includes a respective first track identifier (ID); the one or more non-cooperative sensors comprise: a first sensor category operative to provide a respective second measurement track for each of the one or more objects or targets around the vehicle, wherein each respective second measurement track includes a respective second track ID; a second sensor category including: a first sensor sub-category operative to provide consistent sequences of track measurements originating from a same object or target, but with inconsistent and changing track IDs; and a second sensor sub-category operative to provide multiple measurement tracks with consistent IDs for an object or target, but with the multiple measurement tracks at a measurement epoch for the object or target; and a third sensor category operative to provide measurement returns without a measurement track correlation or ID; a detect and avoid module hosted on an onboard processor, the detect and avoid module configured to receive the respective first measurement track from the one or more cooperative sensors, and the respective second measurement track from the first sensor category of the one or more non-cooperative sensors; and a correlator system hosted on an onboard processor, the correlator system in operative communication with the detect and avoid module, the correlator system configured to receive measurements from the second or third sensor categories of the one or more non-cooperative sensors, and to output one or more correlated measurement tracks; a navigation system onboard the vehicle and operative to calculate a navigation solution for the vehicle, the navigation system in operative communication with the detect and avoid module, and with the correlator system; wherein the detect and avoid module is operative to fuse the respective first measurement track from the one or more cooperative sensors, the respective second measurement track from the first sensor category of the one or more non-cooperative sensors, and the one or more correlated measurement tracks from the correlator system, to thereby estimate an optimal track for each of the one or more objects or targets; wherein the optimal track for each of the one or more objects or targets is used by the detect and avoid module to provide guidance to an onboard vehicle guidance and/or control system to remain well clear of the one or more objects or targets.

Example 2 includes the system of Example 1, wherein for the one or more cooperative sensors, the respective first track ID for each respective first measurement track is an International Civil Aviation Organization (ICAO) identification number.

Example 3 includes the system of any of Examples 1-2, wherein the one or more cooperative sensors comprises an automatic dependent surveillance-broadcast (ADS-B) sensor, or a traffic collision avoidance system (TCAS) mode-S sensor.

Example 4 includes the system of any of Examples 1-3, wherein for the first sensor category of the one or more non-cooperative sensors, the respective second track ID for each respective second measurement track is a sensor specific ID.

Example 5 includes the system of any of Examples 1-4, wherein the first sensor category of the one or more non-cooperative sensors comprises a TCAS mode-C sensor.

Example 6 includes the system of any of Examples 1-5, wherein the second and third sensor categories of the one or more non-cooperative sensors comprises an airborne radar, a ground-based radar, or a vision sensor.

Example 7 includes the system of any of Examples 1-6, wherein the second and third sensor categories of the one or more non-cooperative sensors are configured to receive ground based information, including intruder aircraft position relative to a map.

Example 8 includes the system of any of Examples 1-7, wherein the correlator system is operative to: identify sequences of measurements that originate from the same object or target regardless of the type of non-cooperative sensor and sensor provided measurement track ID; override any ID provided by a sensor and assign an ID to a measurement track itself for any non-cooperative sensors in the first sensor sub-category; fuse measurement returns from multiple measurement tracks of a sensor to generate a fused measurement track and assign an ID to the fused measurement track, overriding any track ID assigned by the sensor, for any non-cooperative sensors in the second sensor sub-category; and identify sequences of measurement returns that originate from the same object or target and assign the sequences an ID, for any non-cooperative sensors in the third sensor category.

Example 9 includes the system of any of Examples 1-8, wherein the correlator system comprises: a format measurements unit, and a target/feature motion classifier, which are each configured to receive measurement returns from the second and third sensor categories of the one or more non-cooperative sensors, and navigation statistics for the vehicle from the navigation system; a relative target/feature motion model responsive to an output from the target/feature motion classifier; a correlator unit responsive to outputs from the format measurements unit and the relative target/feature motion model; and a format track output statistics unit responsive to an output from the correlator unit and configured to receive sensor lever arm data; wherein the format track output statistics unit is operative to compute correlated measurement tracks, which are output to the detect and avoid module.

Example 10 includes the system of Example 9, wherein the format measurements unit is operative to use the navigation statistics to resolve the received measurement returns into a correlation reference frame specific for a given sensor Example 11 includes the system of any of Examples 9-10, wherein the target/feature motion classifier is configured to use a multi-sensor scene segmentation technique to categorize vision sensor measurements into one or more stationary features or moving targets.

Example 12 includes the system of any of Examples 9-11, wherein the relative target/feature motion model is configured to select model parameters based on a velocity and altitude of the vehicle, a velocity of one or more moving targets or stationary features in a captured scene, and a relative velocity of the one or more moving targets or stationary features in the scene.

Example 13 includes the system of any of Examples 9-12, wherein the correlator unit is operative to provide multiple sub-functions including data association, track management, and correlation filtering, wherein the sub-functions are interdependent and operate together to formulate measurement tracks for use in the detect and avoid module.

Example 14 includes the system of any of Examples 1-13, wherein the correlator system is hosted on an onboard processor that is part of at least one sensor in the surveillance sensor arrangement.

Example 15 includes the system of any of Examples 1-14, wherein the detect and avoid module includes a tracking system that is configured to process the respective first measurement track from the one or more cooperative sensors, the respective second measurement track from the first sensor category of the one or more non-cooperative sensors, and the one or more correlated measurement tracks from the correlator system.

Example 16 includes the system of Example 15, wherein the tracking system is operative to provide multiple subfunctions including data association, track management, and state estimation.

Example 17 includes the system of Example 16, wherein the track management operates together with the data association to perform the following process: initiate intruder aircraft tracks; maintain the intruder aircraft tracks; manage track IDs output by the sensors; reject false measurements and minimize generation of false tracks; and delete the intruder aircraft tracks for the intruder aircraft that leave a sensor's field of regard.

Example 18 includes the system of any of Examples 16-17, wherein the state estimation is operative to fuse active track statistics with statistics of measurements associated with a track to predict track statistics and update the track statistics, to provides an estimate of the track statistics of intruder aircraft relative to the ownship aircraft.

Example 19 includes the system of any of Examples 1-18, wherein the vehicle is an ownship aircraft, and the one or more objects or targets include intruder aircraft.

Example 20 includes the system of any of Examples 1-19, wherein the vehicle is an unmanned aircraft systems (UAS) vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system, comprising:

a surveillance sensor arrangement onboard a vehicle, the surveillance sensor arrangement comprising one or more cooperative sensors, one or more non-cooperative sensors, or a combination of one or more cooperative sensors and one or more non-cooperative sensors, wherein:

the one or more cooperative sensors are operative to provide a respective first measurement track for each of one or more objects or targets in an environment around the vehicle, wherein each respective first measurement track includes a respective first track identifier (ID);

the one or more non-cooperative sensors comprise:

a first sensor category operative to provide a respective second measurement track for each of the one or more objects or targets around the vehicle, wherein each respective second measurement track includes a respective second track ID;

a second sensor category including:

a first sensor sub-category operative to provide consistent sequences of track measurements originating from a same object or target, but with inconsistent and changing track IDs; and a second sensor sub-category operative to provide multiple measurement tracks with consistent IDs for an object or target, but with the multiple measurement tracks at a measurement epoch for the object or target; and a third sensor category operative to provide measurement returns without a measurement track correlation or ID;

a detect and avoid module hosted on an onboard processor, the detect and avoid module configured to receive the respective first measurement track from the one or more cooperative sensors, and the respective second measurement track from the first sensor category of the one or more non-cooperative sensors; and a correlator system hosted on an onboard processor, the correlator system in operative communication with the detect and avoid module, the correlator system configured to receive measurements from the second or third sensor categories of the one or more non-cooperative sensors, and to output one or more correlated measurement tracks;

a navigation system onboard the vehicle and operative to calculate a navigation solution for the vehicle, the navigation system in operative communication with the detect and avoid module, and with the correlator system;

wherein the detect and avoid module is operative to fuse the respective first measurement track from the one or more cooperative sensors, the respective second measurement track from the first sensor category of the one or more non-cooperative sensors, and the one or more correlated measurement tracks from the correlator system, to thereby estimate an optimal track for each of the one or more objects or targets;

wherein the optimal track for each of the one or more objects or targets is used by the detect and avoid module to provide guidance to an onboard vehicle guidance and/or control system to remain well clear of the one or more objects or targets.

2. The system of claim 1, wherein for the one or more cooperative sensors, the respective first track ID for each respective first measurement track is an International Civil Aviation Organization (ICAO) identification number.

3. The system of claim 2, wherein the one or more cooperative sensors comprises an automatic dependent surveillance-broadcast (ADS-B) sensor, or a traffic collision avoidance system (TCAS) mode-S sensor.

4. The system of claim 1, wherein for the first sensor category of the one or more non-cooperative sensors, the respective second track ID for each respective second measurement track is a sensor specific ID.

5. The system of claim 4, wherein the first sensor category of the one or more non-cooperative sensors comprises a TCAS mode-C sensor.

6. The system of claim 1, wherein the second and third sensor categories of the one or more non-cooperative sensors comprises an airborne radar, a ground-based radar, or a vision sensor.

7. The system of claim 1, wherein the second and third sensor categories of the one or more non-cooperative sensors are configured to receive ground based information, including intruder aircraft position relative to a map.

8. The system of claim 1, wherein the correlator system is operative to:

identify sequences of measurements that originate from the same object or target regardless of the type of non-cooperative sensor and sensor provided measurement track ID;

override any ID provided by a sensor and assign an ID to a measurement track itself for any non-cooperative sensors in the first sensor sub-category;

fuse measurement returns from multiple measurement tracks of a sensor to generate a fused measurement track and assign an ID to the fused measurement track, overriding any track ID assigned by the sensor, for any non-cooperative sensors in the second sensor sub-category; and identify sequences of measurement returns that originate from the same object or target and assign the sequences an ID, for any non-cooperative sensors in the third sensor category.

9. The system of claim 1, wherein the correlator system comprises:

a format measurements unit, and a target/feature motion classifier, which are each configured to receive measurement returns from the second and third sensor categories of the one or more non-cooperative sensors, and navigation statistics for the vehicle from the navigation system;

a relative target/feature motion model responsive to an output from the target/feature motion classifier;

a correlator unit responsive to outputs from the format measurements unit and the relative target/feature motion model; and a format track output statistics unit responsive to an output from the correlator unit and configured to receive sensor lever arm data;

wherein the format track output statistics unit is operative to compute correlated measurement tracks, which are output to the detect and avoid module.

10. The system of claim 9, wherein the format measurements unit is operative to use the navigation statistics to resolve the received measurement returns into a correlation reference frame specific for a given sensor.

11. The system of claim 9, wherein the target/feature motion classifier is configured to use a multi-sensor scene segmentation technique to categorize vision sensor measurements into one or more stationary features or moving targets.

12. The system of claim 9, wherein the relative target/feature motion model is configured to select model parameters based on a velocity and altitude of the vehicle, a velocity of one or more moving targets or stationary features in a captured scene, and a relative velocity of the one or more moving targets or stationary features in the scene.

13. The system of claim 9, wherein the correlator unit is operative to provide multiple sub-functions including data association, track management, and correlation filtering, wherein the sub-functions are interdependent and operate together to formulate measurement tracks for use in the detect and avoid module.

14. The system of claim 1, wherein the correlator system is hosted on an onboard processor that is part of at least one sensor in the surveillance sensor arrangement.

15. The system of claim 1, wherein the detect and avoid module includes a tracking system that is configured to process the respective first measurement track from the one or more cooperative sensors, the respective second measurement track from the first sensor category of the one or more non-cooperative sensors, and the one or more correlated measurement tracks from the correlator system.

16. The system of claim 15, wherein the tracking system is operative to provide multiple sub-functions including data association, track management, and state estimation.

17. The system of claim 16, wherein the track management operates together with the data association to perform the following process:

initiate intruder aircraft tracks;

maintain the intruder aircraft tracks;

manage track IDs output by the sensors;

reject false measurements and minimize generation of false tracks; and delete the intruder aircraft tracks for the intruder aircraft that leave a sensor's field of regard.

18. The system of claim 16, wherein the state estimation is operative to fuse active track statistics with statistics of measurements associated with a track to predict track statistics and update the track statistics, to provides an estimate of the track statistics of intruder aircraft relative to the ownship aircraft.

19. The system of claim 1, wherein the vehicle is an ownship aircraft, and the one or more objects or targets include intruder aircraft.

20. The system of claim 1, wherein the vehicle is an unmanned aircraft systems (UAS) vehicle.

* * * * *